Sept. 24, 1940.   H. M. HOBART   2,216,010

HIGH TENSION ELECTRIC CABLE

Filed June 9, 1937

Inventor:
Henry M. Hobart,
by Harry E. Dunham
His Attorney.

Patented Sept. 24, 1940

2,216,010

UNITED STATES PATENT OFFICE 2,216,010

HIGH TENSION ELECTRIC CABLE

Henry M. Hobart, Niskayuna, N. Y., assignor to General Electric Company, a corporation of New York Application June 9, 1937, Serial No. 147,289

2 Claims. (Cl. 174—28)

At the present time, it is the established practice in the manufacture of high tension electric cables to use dense calendered paper for insulating the conductors, applied in the form of strips or ribbons of many layers to obtain the desired thickness. Outside of the paper insulation so applied is an impervious sheath, usually of lead. The paper so employed is impregnated with a suitable insulating material which for the lower voltages is usually a heavy viscous compound and for high voltages a thin oil. It has been suggested that dry paper applied in strip form layer by layer be employed as insulation and that the paper be subjected to nitrogen gas under relatively low pressure. In a cable so constructed, the percentage of gas to the paper by volume is relatively small due to the density of the paper. The paper employed necessarily has to have considerable tensile strength in order to permit of its application to the conductor under tension to prevent wrinkles, and this in turn means that its density is relatively great, and hence the volume of gas which it will absorb is relatively small.

My investigations have demonstrated that if gas alone under high pressure is used as the insulating medium for high tension cables, greatly superior results may be obtained. However, such a cable presents the difficulty of supporting the bare conductor or conductors in spaced relation to the metallic sheath. This is due to the fact that solid insulating material for the same thickness is much less effective than gas under high pressure.

My invention has for its object an improved electric cable of the gas filled type wherein highly porous insulating material is employed to support the conductor or conductors and insulating gas under high pressure employed to fill the pores of said material and which by reason of its large volume compared to that of the solid material constitutes by far the major portion of the insulation of the conductor.

For a consideration of what I believe to be novel and my invention, attention is directed to the accompanying description and the claims appended thereto.

Figure 1:
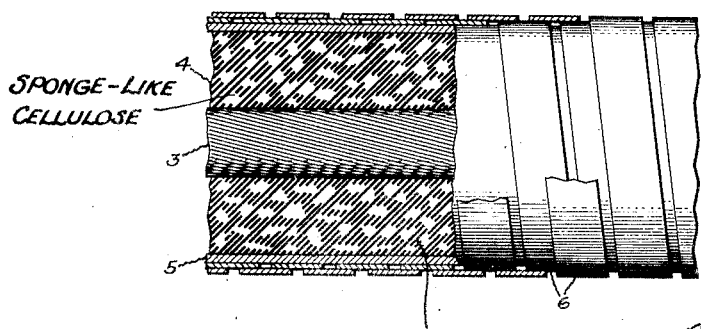
Figure 3:
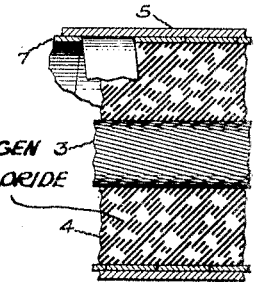
Figure 2:
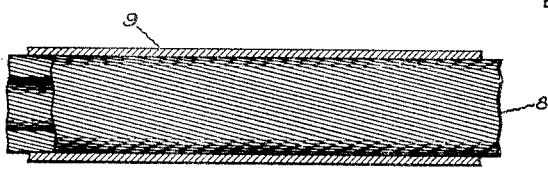
Figure 4:
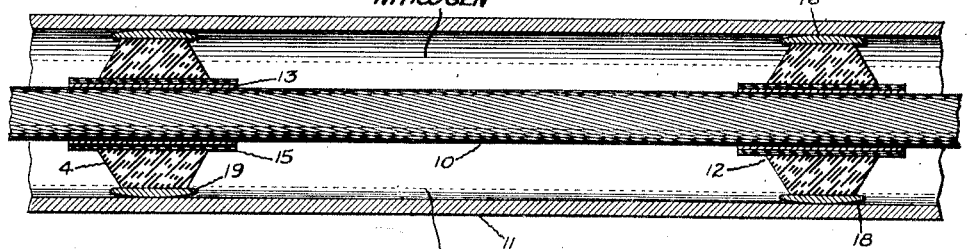
Figure 5:
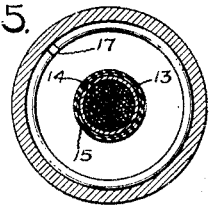

In the drawing which is illustrative of my invention, Fig. 1 is a view partly in elevation and partly in section of a piece of cable; Fig. 2 is a modified form of conductor; Fig. 3 illustrates a detail of construction; Fig. 4 illustrates a modified form of the invention; and Fig. 5 is a cross-section of the cable shown in Fig. 4.

In Fig. 1, 3 indicates a stranded copper conductor of suitable cross-section to carry the current at the applied voltage without undue loss. Surrounding the conductor is a body of well dried insulation 4, the character of which will be referred to later. The insulation is enclosed in a metallic sheath 5 made of lead or other suitable material. Because of the high gas pressure employed which may be of the order of 600 pounds per square inch, the sheath is provided with suitable strengthening means of which strong metal tapes 6 wound around the sheath in overlapping layers may be taken as an example. The cable will be made up in suitable lengths to suit the customer and shipped on reels in the same manner as ordinary types of cable. During shipment and while in storage, the cable should be filled with dry gas under a low but nevertheless super-atmospheric pressure to prevent the entrance of foreign matter, particularly moisture, and the ends of the cable should be suitably capped. After the cable lengths are installed underground, either in trenches or in conduits, and suitably spliced or connected, the cable sheath is filled with thoroughly dehydrated gas, such for example as pure, clean nitrogen at a determined high pressure which may be of the order of 400 to 600 pounds per square inch and which is saturated with the vapor of some halide which, in the gaseous form, is itself a strong gaseous dielectric. As an illustration of the advantage of combining a gas with the vapor of a halide, tests show that air at 25° C. has its dielectric strength more than doubled when saturated with vapor of $CCl_4$. Other halides of lower vaporization temperature are known to act similarly. The evidence at present available indicates that these other halides do not, by themselves, have so great dielectric strength as $CCl_4$. Nitrogen at a pressure of some 600 lbs. per square inch saturated with carbon tetrachloride appear to constitute the most favorable gaseous material. The gas may be supplied to the cable in any suitable way as, for example, from tanks having strong walls.

For the insulating material 4 for the conductor, I employ a sponge-like material made of pure or substantially pure cellulose, one so full of pores or interstices that its specific gravity is about 0.05 whereas the specific gravity of ordinary cable paper is about 1.5. The solid matter in the material is approximately 3½ per cent of the total volume and the remainder well distributed spaces, interstices or voids. The voids in the material are of two kinds, minute voids such as are present in all cable papers and large voids which to distinguish them from the minute voids may be designated as interstices admitting of absorption or passage of the high pressure insulating gas. The interstices are indicated approximately by the white spots in the insulation of the several figures, and it is due to them that the initial specific gravity of about 0.05 is obtained, and also the low percentage of solid matter to total volume. Considered from one point of view, the minute voids are inherent in the material while the large voids or interstices are deliberately preformed during the manufacture of the material. Such material when well dried and used alone has fairly good insulating properties provided the voltage imposed on the conductor is relatively low. On account of its sponge-like formation, it is not when in its fully expanded or normal condition, capable of sustaining any appreciable compression load such as that due to an electric conductor intended to carry heavy current, and at the same time preserve the desired spacing of the conductor with respect to the inner wall of the sheath. To enable the material to support the conductor in the proper spaced relation within the sheath, it is compressed before being inserted in the sheath. As an example, it may be compressed so as to have a specific gravity of 0.12 or about two and one-half times that of its initial. The solid part per unit area is increased by the compression to about 8 per cent. The sheath may be applied over the insulation in any suitable manner but because the material is elastic and has a tendency to return to its maximum size when relieved of compression pressure, the application of the sheath presents certain problems not present in the manufacture of ordinary paper insulated cable.

From the mass of the porous insulation of pure or substantially pure cellulose, there is first thoroughly extracted from the mass of the small amount of very light solid but absorptive, porous cellulose, the harmful aqueous humidity originally present in it. This is then replaced by dielectrically excellent insulating humidity in the form of liquid $CCl_4$ or other appropriate halide which is soaked up into the dry cellulose and will serve not only to increase the dielectric strength of the solid insulation but will also constitute a reserve source of liquid $CCl_4$ of which a portion (varying with the temperature of the inside of the cable and hence with the load on the cable), will be vaporized and will serve to maintain the nitrogen at the saturation value corresponding to the particular temperature at any time. When, for a given gas pressure, the temperature decreases, the amount of $CCl_4$ which can exist in gaseous form in mixture with the nitrogen, will be decreased and the amount corresponding to the decrease will be liquefied and will be accommodated at the bottom of the enclosing pipe or in sumps such as may be formed by the casings of the joints between adjacent lengths of cable. If advantage is not taken of the absorptive properties of the dry cellulose, I may, as an alternative, have a surplus of $CCl_4$ in liquid form in tanks along the route and in communication with the interior of the cable and other tanks containing the compressed nitrogen. Also, I may employ circulating and mixing procedures. It is evident that as an alternative the insulating gas may be mixed with a determined amount of the vapor of the insulating liquid prior to charging the pipe.

As an example of one way to apply the sheath over the compressed insulation, the latter may be held in a compressed state on the conductor by means of a thin wall cylinder or container 7 which may be made of metal tapes wrapped around the material in such a way as to compress it to the desired degree and also hold it in such state. When properly compressed around the conductor in the manner described, the conductor and its covering may be fed into a lead press of ordinary construction and the sheath applied in the usual manner. The use of a container 7 to hold the material under compression also permits of drawing the conductor and its covering lengthwise into a rigid pipe where it is desired to use such a pipe as a sheath or enclosure.

In Fig. 2 is shown a conductor 8 made of strands of aluminum which may be substituted for the copper strands in case the price of copper is unduly high. The conductor instead of being made of closely packed strands may be hollow as illustrated, following in this particular the construction of oil filled cables. Such a cable may have a larger diameter for the same conductivity with a corresponding reduction in the tendency of the high potential to produce corona effects. To increase the ionization strength of the gas filling in the region of the conductor, it is desirable to cover the strands with a thin layer of lead or equivalent material 9. This lead covering may also be used with a conductor having copper strands. The lightness of the aluminum conductor will decrease the compression load to be borne by the porous insulation and to the extent that the load is decreased, the compression of the insulation may be decreased.

Thus far, my invention has been described in connection with a cable, the conductor of which is insulated by porous material throughout its entire length but it is also applicable to cables wherein the conductor is held in place and insulated by suitably spaced supports. In Fig. 4 is shown such a cable wherein 10 indicates the conductor which may be stranded where the cable is to be reeled or solid when reeling is not necessary. It should not be solid if of such large diameter as (with 60 cycles) to have too much increased resistance and loss due to skin effect. The conductor is or may be bare. In any event, no attempt is made to completely cover it with an insulation which would withstand the voltage to which the conductor is subjected. 11 indicates a sheath which may be of lead where reeling is desirable or it may be made of other material such as steel or heavy glass where reeling is not a requisite. The conductor is carried by insulating supports 12 located at spaced intervals instead of being insulated throughout its length. For this purpose, the conductor adjacent each support is desirably provided with a short thin wall metal cylinder 13 corresponding generally to the covering 9 of Fig. 2. To avoid the necessity of having to slip the cylinders endwise over long lengths of conductor, they may be split longitudinally as at 14 as indicated in Fig. 5 so that each may be applied locally. Surrounding the metal cylinder is a thin body of insulation 15 such as mica or cellulose acetate, said insulation having a greater axial length than the insulating support proper so as to increase the creepage surface. The main insulator 4 is of the same character as that previously described, being made of porous material and suitably compressed. In order to hold the material under compression, it is surrounded by a confining ring 16 which in function is similar to the metallic enclosure 7 of Fig. 3. It may be made in one piece but is desirably split as at 17, Fig. 5, to permit it to be snapped into place. The opening due to the split also forms a passage for the gas. The peripheral surface of the ring is beveled or slightly rounded from the center toward the edges as indicated at 18 to facilitate drawing the conductor and its supports into the sheath or pipe 11. The edges of the ring are also well rounded at 19 to prevent the concentration of electrical stresses. The sheath or pipe is filled with a clean, dehydrated gas, such as nitrogen saturated with carbon tetrachloride, under high pressure. The gas also fills the pores, interstices or voids in the insulating material 4. The absence of all traces of water from the substantially pure cellulose will permit it to absorb small reserves of liquid $CCl_4$ which spreading through the large surfaces of the spongy cellulose constitute an excellent source from which will emanate the $CCl_4$ vapor required to saturate the nitrogen gas at the pressure and temperature existing in the interior of the cable. By reason of the construction described, it will be seen that the solid matter between the conductor and the sheath has been greatly reduced in amount and at the same time, the percentage of gas to the solid material has been very greatly increased.

My improved cable is more especially intended to carry currents of the order of 200 to 300 amperes at 165,000 volts but is not necessarily limited thereto. The pressure of the mixture of de-hydrated nitrogen gas and $CCl_4$ vapor with which the nitrogen is saturated, to which the insulation is subjected may be of the order of 600 pounds per square inch for cable operating under the conditions above stated but for other operating conditions, a greater or lesser gas pressure may be used.

One of the great advantages of my improved cable is the reduction of the charging current over that in ordinary paper insulated cables. The reduction by compression of the sponge-like insulating material increases the average dielectric constant somewhat above that of a cable using gas only but the increase is not serious. This may be easily offset, however, by increasing the radial distance between the conductor and the sheath over what would otherwise be employed. Any enlargement of the diameter of the sheath increases the cost and is to be avoided for that reason where possible.

In the manufacture of the cable, it is important that water humidity be extracted as fully as possible from the insulation. This may be done by the use of a vacuum pump and heat after the conductor and insulation are sheathed or the gas originally in the sheath may be replaced by a gas which has been dried by circulating it past cooling coils operating at a suitably low temperature. The use of insulating material which is highly elastic, as distinguished from the use of tightly wrapped paper insulation arranged in layers, results in a cable which may be more easily reeled and unreeled because it is not so stiff. A further advantage of the construction resides in the fact that the troubles incident to the turns of paper slipping one on the other or wrinkling are avoided. In this connection, it is to be noted that when a cable having paper insulation is bent as in winding it on a reel, there is a tendency to separate the turns of paper at the outer part of the turn and to compress and sometimes to wrinkle the paper at the inner part of said turn.

What I claim as new and desire to secure by Letters Patent of the United States is:

1. An electric cable comprising a bare conductor, an impervious sheath therefor, a unitary body of elastic porous insulation supporting the conductor out of contact with the sheath and having within its mass minute voids and relatively large interstices, a means enclosing the body located between it and the sheath and exerting compression pressure thereon sufficient to enable the body to sustain the weight of the conductor, the interstices permitting such compression, and a filling of relatively high pressure insulating gas for the sheath and also the voids and interstices in the insulation, the value of the gas as a dielectric being substantially greater per unit of thickness than that of the porous material in the insulation.

2. An electric cable comprising a bare conductor, an impervious sheath therefor, a unitary body of elastic porous insulation supporting the conductor out of contact with the sheath and having within its mass minute voids and relatively large interstices, a means enclosing the body located between it and the sheath and exerting compression pressure thereon sufficient to enable the body to sustain the weight of the conductor, the interstices permitting such compression, and a body of fluid filling the sheath and the interstices under high pressure, the fluid comprising materials one of which is permanently in a gaseous condition under operating conditions of the cable and another a liquid or gas in whole or in part depending upon said operating conditions, the value of the fluid as a dielectric per unit of thickness being many times greater than that of the porous insulation.

HENRY M. HOBART.